(12) United States Patent
Verge

(10) Patent No.: US 11,698,247 B2
(45) Date of Patent: Jul. 11, 2023

(54) LINEAR ABSOLUTE POSITION SENSING USING CAPACITIVE SENSING

(71) Applicant: Cypress Semiconductor Corporation, San Jose, CA (US)

(72) Inventor: Gregory John Verge, Lynnwood, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 72 days.

(21) Appl. No.: 17/231,907

(22) Filed: Apr. 15, 2021

(65) Prior Publication Data

US 2021/0325166 A1 Oct. 21, 2021

Related U.S. Application Data

(60) Provisional application No. 63/012,487, filed on Apr. 20, 2020.

(51) Int. Cl.
*G06F 3/041* (2006.01)
*G01B 7/00* (2006.01)
*G01D 5/24* (2006.01)
*G06F 3/044* (2006.01)

(52) U.S. Cl.
CPC .............. *G01B 7/003* (2013.01); *G01D 5/24* (2013.01); *G06F 3/044* (2013.01); *G06F 3/04166* (2019.05); *G06F 2203/04107* (2013.01)

(58) Field of Classification Search
CPC ...... G01B 7/003; G01D 5/24; G01D 2205/90; G01D 5/2403; G06F 3/04166; G06F 3/041; G06F 3/044; G06F 2203/04107
See application file for complete search history.

(56) References Cited

U.S. PATENT DOCUMENTS

| 2012/0268142 A1 | 10/2012 | Kremin et al. |
| 2013/0021294 A1 | 1/2013 | Maharyta et al. |
| 2019/0097316 A1 | 3/2019 | Cruise |
| 2020/0064938 A1 | 2/2020 | Gray et al. |

(Continued)

FOREIGN PATENT DOCUMENTS

DE 102019209494 A1 * 1/2020 ............. G01B 3/205

OTHER PUBLICATIONS

International Search Report for International Application No. PCT/US2021/027772 dated Jul. 22, 2021; 2 pages.

(Continued)

*Primary Examiner* — Natalie Huls
*Assistant Examiner* — James I Burris

(57) ABSTRACT

The embodiments described herein are directed to systems and devices for electronically measuring the absolute position of one or more moving targets e.g., along the length of a metal beam using mutual capacitive sensing. The beam may be made of metal and may have a limited inset area to fit a position detection sensor device along its length. The moving targets may have no active elements and the position of multiple targets may be detected simultaneously along the beam. The systems and devices described herein do not utilize electronic position feedback and instead rely on an integrated ruler and minimize the total number of sensors required to support recalibration, thereby minimizing scan time (more sensors results in a linear increase in scan time).

20 Claims, 10 Drawing Sheets

(56) References Cited

U.S. PATENT DOCUMENTS

2020/0110506 A1    4/2020  Rosenberg et al.
2020/0201510 A1*   6/2020  Kurasawa ............. G06F 3/0443

OTHER PUBLICATIONS

Written Opinion of the International Search Authority for International Application No. PCT/US2021/027772 dated Jul. 22, 2021; 4 pages.
Xia et al., "Tri-Mode Capacitive Proximity Detection Towards Improved Safety in Industrial Robotics", IEEE, Jun. 15, 2018; 9 pages.

\* cited by examiner

| n | r | # RX Columns | Total RX mm | Total mm | # TX Required |
|---|---|---|---|---|---|
| 6 | 3 | 20 | 40 | 750 | 19 |
| 7 | 3 | 35 | 70 | 750 | 11 |
| 8 | 4 | 70 | 140 | 750 | 6 |
| 9 | 4 | 126 | 252 | 750 | 3 |
| 10 | 5 | 252 | 504 | 750 | 2 |
| 11 | 5 | 462 | 924 | 750 | 1 |

*FIG. 2D*

LINEAR ABSOLUTE POSITION SENSING USING CAPACITIVE SENSING

RELATED APPLICATIONS

This application claims priority to U.S. Provisional Patent Application No. 63/012,487, filed on Apr. 20, 2021, the disclosure of which is hereby incorporated herein in its entirety.

TECHNICAL FIELD

The present disclosure relates generally to position sensing systems, and more particularly to position sensing systems that utilize capacitive sensing to determine the position of one or more targets.

BACKGROUND

Capacitive sense arrays function by measuring the capacitance of a capacitive sense element and evaluating for a delta in capacitance indicating a touch or presence of a conductive object. When a conductive object (e.g., a finger, hand, or other object) comes into contact or close proximity with a capacitive sense element, the capacitance changes and the conductive object is detected. Capacitance sensing systems can sense electrical signals generated on electrodes that reflect changes in capacitance. Such changes in capacitance can indicate a touch event (i.e., the proximity of an object to particular electrodes) and can be used to determine a position/location of the touch event. The capacitance changes can be measured by an electrical circuit that converts the signals corresponding to measured capacitances of the capacitive sense elements into digital values. The measured capacitances are generally received as currents or voltages that are integrated and converted to the digital values.

There are two typical types of capacitance: 1) mutual capacitance where the capacitance-sensing circuit measures a capacitance formed between two electrodes coupled to the capacitance-sensing circuit; 2) self-capacitance where the capacitance-sensing circuit measures a capacitance of a single electrode. Many devices have a distributed load of capacitance of both types (1) and (2) and some devices sense both capacitances either uniquely or in hybrid form with their various sense modes. Capacitive sense elements are widely used in modern customer applications (e.g., GPS devices, set-top boxes, cameras, computer screens, MP3 players, and digital tablets) and can provide reliable operation under harsh conditions.

BRIEF DESCRIPTION OF THE DRAWINGS

The present embodiments are illustrated by way of example, and not of limitation, in the figures of the accompanying drawings.

FIG. 2D illustrates a table listing the maximum number of unique combinations of Rx signals (RX columns) based on a desired position detection resolution.

DETAILED DESCRIPTION

Figure 1:
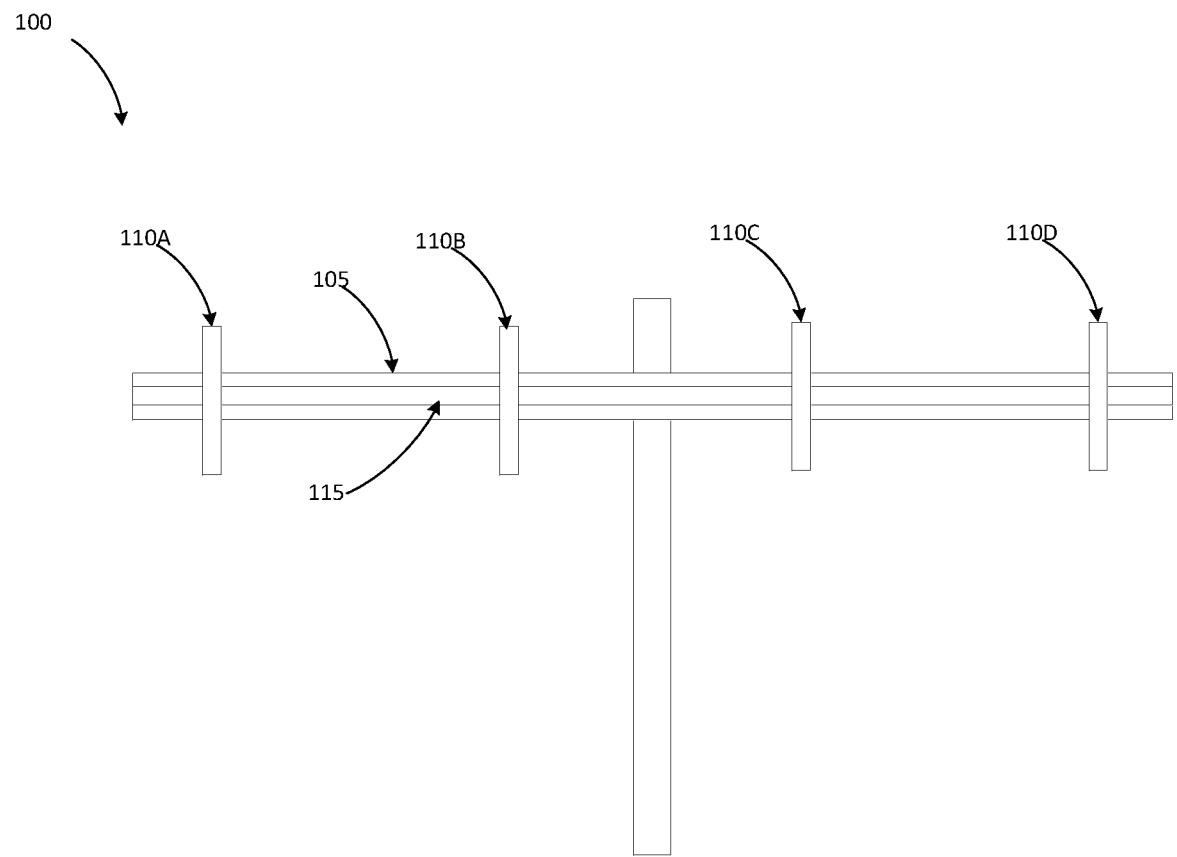
FIG. 1 is a diagram illustrating a position sensing system, according to some embodiments of the present disclosure.

In the following description, for purposes of explanation, numerous specific details are set forth in order to provide a thorough understanding of the present embodiments. It will be evident, however, to one skilled in the art that the present embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

Position sensing systems have a wide range of applications including automotive, machine tool metrology, disc drive runout measurement, and assembly line testing among others. In the automotive context, many vehicles are utilizing increasing levels of driver assistance that rely on safety sensors, such as active collision avoidance. Recalibrating the safety sensors (e.g., lane monitoring cameras, collision detection cameras) on such vehicles after an accident etc. is becoming more complex and critical for safety. For example, various different cameras may need to be calibrated to make sure they are looking in the right direction/at the right area. The position such cameras need to be in may change from car to car, and manufacturer to manufacturer. Such position sensing can be difficult, especially in a harsh environment such as an automotive repair shop. Such position sensing systems may operate by detecting the position of one or more moving targets (that could represent e.g., various safety sensors) along a fixed track that includes position sensors. Electronic position sensors can decrease calibration errors and allow for the calibrated position to be recorded so that documentation of the calibration process can be provided for legal compliance.

Currently, there are three methods that are used for non-contact absolute position detection. The first method is commonly used on rotary encoders and uses two channels generating sine and cosine signals which are used to calculate absolute position. This method can be used over limited linear distances and produces very small signal differences for position changes over a large length which increases position error.

The second method uses an active sensor on the moving target and a passive sensor pattern on a fixed portion to measure relative position. This method requires active components on the moving target such as a power source and communication hardware, which adds complication and cost to the design. The second method also commonly measures relative position movement information and must be calibrated before each use to output absolute position. The first two methods described above are sensitive to alignment errors or small levels of contamination that can increase position error.

The third method uses a linear slider to detect the target location using one of two sensor patters. The first pattern is often referred to as a ladder of backgammon pattern and comprises two tapered opposing sensor patterns. Backgammon patterns have poor accuracy as any imbalance in sensor signals creates a position error, and so cannot be used for absolute position sensing. The second pattern is often referred to as a double chevron pattern, which comprises a series of discrete sensor patterns, and can be used to provide absolute position detection. However, the accuracy of such position detection is limited and the total number of sensors needed increases linearly with distance. Thus, a large number of sensors is required along the whole length of the beam which in turn results in pin number, routing space, and high parasitic capacitance constraints. Both sensor patterns have relatively low accuracy as they are optimized for human interface where feedback allows the user to compensate for target position errors. Additionally, both sensor methods require periodic target release to update sensor baseline data to maintain accurate position detection. Periodic target release is generally not feasible in mechanical position sensing applications.

The embodiments described herein are directed to systems and devices for electronically measuring the absolute position of one or more moving targets e.g., along the length of a metal beam using mutual capacitive sensing. The beam may be made of metal and may have a limited inset area to fit a position detection sensor device along its length. The moving targets may have no active elements and the position of multiple targets may be detected simultaneously along the beam. The systems and devices described herein do not utilize electronic position feedback and instead rely on an integrated ruler and minimize the total number of sensors required to support recalibration, thereby minimizing scan time (more sensors results in a linear increase in scan time). The systems and devices described herein also allow the capacitance of each receiver pin to stay constant relative to the other receiver pins.

In one embodiment, a sensor device is disclosed, the sensor device may comprise a plurality of receive (Rx) sensors organized into a plurality of Rx columns, each Rx sensor of the plurality of Rx sensors driven by an Rx signal of a set of Rx signals and wherein the Rx sensors of each Rx column are driven by a unique combination of Rx signals of the set of Rx signals based on a gray code. The sensor device further comprises one or more transmit (Tx) sensors, each of the one or more transmit sensors configured to capacitively couple to the Rx sensors of one or more Rx columns in response to a target moving into proximity of the one or more Rx columns. The sensor device may further comprise a memory and a processing device operatively coupled to the memory. The processing device may be configured to scan each of the plurality of Rx sensors and determine a position of the target based on the scan of each of the plurality of Rx sensors using mutual capacitive sensing.

Figure 2A:
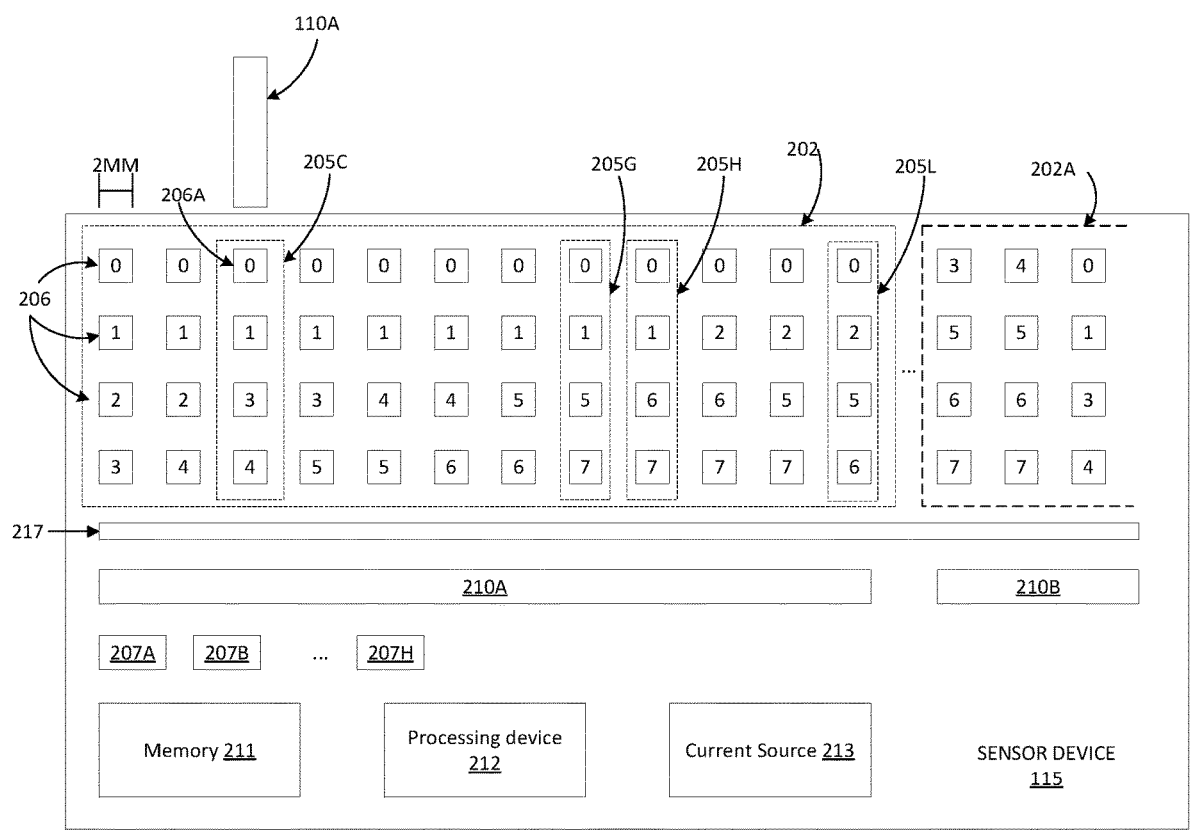
FIGS. 2A and 2B illustrate a sensor device of the position sensing system of FIG. 1, according to some embodiments of the present disclosure.

FIG. 1 illustrates a position sensing system 100 (hereinafter referred to as system 100) in accordance with some embodiments of the present disclosure. The system 100 may comprise a measurement beam 105 and one or more movable optical targets 110A-110D (hereinafter referred to as targets 110). The measurement beam may be of any suitable length (e.g., 750 mm long) and may be made of any appropriate metal. Although illustrated as a straight track in FIG. 1, the measurement beam 105 may comprise a straight, curved, circular, or any other appropriate shaped track. The measurement beam 105 may comprise a channel (not shown) inset therein which provides a limited area within which a sensor device 115 may be located along the length of the measurement beam 105. Each target 110 may be movably coupled to the measurement beam 105 such that it can move (e.g., slide) along the measurement beam 105. In some embodiments, instead of being coupled to the measurement beam 105, the targets 110 may each be held in alignment with the measurement beam 105 by a separate mechanical element (e.g., a sliding vice) that may also function to move the targets 110 along the measurement beam 105. Each target 110 may comprise a metal strip that acts as a conductive plate to capacitively couple the Tx sensors and Rx sensors of the sensor device 115 (illustrated in FIGS. 2A and 2B) together as discussed in further detail herein. Each target 110 may have any appropriate width (e.g., 2 mm width as shown in FIG. 2A) based on a desired resolution/accuracy of position detection. Although illustrated with 4 targets 110, the system 100 may comprise any appropriate number of targets 110 as discussed in further detail herein.

FIG. 2A illustrates a block diagram of the sensor device 115. As shown in FIG. 2A, the sensor device 115 may comprise an Rx sensor pattern 202 comprising multiple Rx sensor columns 205A-205L, each with 2 mm spacing as shown in FIG. 2A. Although illustrated in FIG. 2A with 12 Rx sensor columns 205, the Rx sensor pattern 202 may comprise any suitable number of Rx sensor columns 205 with any suitable spacing based on a desired resolution of position detection, as discussed in further detail herein. It should be noted that the Rx sensor pattern 202 may comprise a total length of 140 mm, and that the sensor device 115 is illustrated with a single sensor pattern for ease of illustration and discussion. In order to cover the entire 750 mm distance of the measurement beam 105, the sensor device 115 may comprise multiple repetitions of the same 140 mm Rx sensor pattern 202 until a length of 750 mm is reached. FIG. 2A illustrates a portion of a first duplicate sensor pattern 202A including 3 additional Rx columns as discussed in further detail herein.

Each Rx column 205 may comprise four discrete Rx sensors 206, to form a two-dimensional matrix (also referred to as an XY matrix) of Rx sensors 206. The sensor device 115 may also comprise one or more receive (Rx) channels 207A-207H, and each Rx channel 207A-H may provide a respective Rx signal (e.g., Rx channel 207A may provide Rx signal 1, Rx channel 207B may provide Rx signal 2 etc.) to one or more Rx sensors 206 in order to measure charge on those Rx sensors 206. In the example of FIG. 2A, the sensor device 115 comprises eight Rx channels 207. Each Rx channel 207 may use any appropriate method for measuring capacitance. Although described with respect to mutual capacitance sensing, embodiments of the present disclosure are not limited in this way and any appropriate method for measuring capacitance may be used. Examples of such methods may include current versus voltage phase shift measurement, resistor-capacitor charge timing, capacitive bridge divider, charge transfer, successive approximation, sigma-delta modulators, charge-accumulation circuits, field effect, mutual capacitance, and frequency shift, among other capacitance measurement methods. Each Rx channel 207 may include any appropriate hardware for measuring capacitance such as a relaxation oscillator (or other means to measure capacitance) and a counter or timer to measure the oscillator output. In another example, each Rx channel 207 may include an operational amplifier, a switch, and an integrator capacitor.

Each Rx sensor 206 may be driven by an Rx signal coming from any of the eight different Rx channels 207. The four Rx sensors 206 each Rx column 205 may be driven by a unique combination of four out of the eight possible Rx signals. The eight Rx signals are routed to the Rx sensors 206 with a unique combination for the Rx sensors 206 each Rx column 205 using gray code. The equation for the total number of unique combinations of Rx signals without repetitions may be given as:

$$\text{Total unique combinations} = n!/(r!(n-r)!)$$

where n=number of Rx signals (8) and r=number of Rx sensors per Rx column (4). This gives 70 discrete combinations, thereby allowing for detection of the position of the target 110A with 2 mm accuracy over the 140 mm length of the Rx sensor pattern 202. As shown in FIG. 2A, each Rx sensor 206 includes a number indicating the Rx signal that has been routed to it (i.e., is driving it). Each Rx sensor 206 may be electrically isolated from other Rx sensors 206 having a different input Rx signal. Stated differently, as long as Rx sensors 206 in neighboring Rx columns 205 and in the same row represent the same Rx signal, they can be electrically shorted. This simplifies manufacturing because the sensor pattern may basically comprise long strips that are shorted together. Stated differently, because only one Rx sensor 206 changes its Rx signal from column to column, the shorted together rows on Rx sensors with the same Rx signal act as routing traces simplifying layout. In the example of FIG. 2A, four Rx signals are routed on the top surface to Rx sensors 206, while the remaining four Rx signals can be routed on the bottom layer until required for connection to a Rx sensor 206.

The sensor device 115 may further comprise one or more transmit (Tx) sensors 210 that span across the bottom of the Rx sensor columns 205 as shown in FIG. 2A. Although illustrated in FIG. 2A with 2 Tx sensors 210A and B for simplicity, the sensor device 115 may comprise one or more Tx sensors 210 per sensor pattern 202 duplicate, as discussed in further detail herein. As discussed in further detail herein, as the moving optical target 110A moves across the measurement beam 105, each Rx channel 207 may be configured to measure a mutual capacitance between its respective Rx sensors 206 (i.e., the Rx sensors it provides an Rx signal to) and a corresponding Tx sensor(s) 210 (in the example of FIG. 2A, Tx sensor 210A is the Tx sensor corresponding to the sensor pattern 202).

Each Tx sensor 210 may emit large electric field lines that may attempt to couple to other components of the sensor device 115 (e.g., the first object they can ground to). It is important to minimize this when the target 110A is not present. Thus, sensor device 115 may comprise a guard channel 217 coupled between the Rx sensor columns 205 and the Tx sensors 210 to collapse those electric field lines before they reach the Rx columns 205. More specifically, the guard channel 217 may collapse the electric field between the Rx sensor columns 205 and the Tx sensors 210 in order to minimize direct capacitive coupling that may result when the target 110A is not present.

As the target 110A moves across the measurement beam 105, its precise location along the measurement beam 105 can be determined by the sensor device 115 using mutual capacitive sensing, for example. The sensor device 115 may comprise a processing device 212 and a memory 211, which may store instructions that the processing device 212 may execute to perform the embodiments discussed herein. The sensor device 115 may scan the Rx sensors 206 of each Rx column 205. As used herein, a "scan" of an Rx sensor (e.g., Rx sensor 206A) may refer to a Tx signal (e.g., a 5V square waveform) being driven to the Tx sensor 210A (e.g., by a Tx signal generator—not shown) while a respective Rx channel 207 of the Rx sensor 206A drives its Rx signal (i.e., Rx signal 0) to the Rx sensor 206A in order to measure the mutual capacitance between the Tx sensor 210A and the Rx sensor 206A. As shown in FIG. 2A, when the target 110A is located over Rx column 205C, it may capacitively couple the Tx sensor 210A to the Rx sensors 206 in Rx column 205C. As the square wave Tx signal changes from low to high or high to low, if the sensor 206A and the Tx sensor 210A are capacitively coupled, this may cause charge to be moved on or off the Rx sensor 206A due to the capacitive coupling. Thus, when the sensor 206A and the Tx sensor 210A are coupled, the charge level of the Rx sensor 206A may move up and down based on the square wave Tx signal. If the sensor 206A and the Tx sensor 210A are not coupled, the charge level of the Rx sensor 206A does not move.

Sensor device 115 may further comprise a current source 213 that may function to cancel out any changes in charge on the sensors 206. The sensor device 115 may include a digital timer (not shown) which may measure the amount of time the current source 213 is required to be active in order to cancel a change in charge on e.g., the Rx sensor 206A. Thus, if Rx sensor 206A is not covered by the target 110A, it is not capacitively coupled to the Tx sensor 210A and there is no change in the charge of the Rx sensor 206A. In turn, the current source 213 is not active (or, the amount of time it is active is 0), and the digital timer may output a signal corresponding to 0. If Rx sensor 206A is covered by the target 110A, it is capacitively coupled to the Tx sensor 210A and the charge of the Rx sensor 206A will change based on the square wave Tx signal. In turn, the current source 213 must move charge in and out of the Rx sensor 206A to maintain its balance and the digital timer may measure how long the current source 213 must remain active to perform this function. The digital timer may output a signal corresponding to the time the current source 213 was active, and the sensor device 115 may compare the time to a threshold. If the determined time exceeds the threshold, the sensor device 115 may output a binary 1 for Rx signal 0 (because Rx sensor 206A was driven by Rx signal 0).

For each RX sensor 206 scan, the time the current source 213 was on in order to maintain the charge balance of that Rx sensor 206 is compared to the threshold and a binary output for the Rx signal driving that Rx sensor 206 is generated. As discussed above, for a particular Rx sensor 206, if the time the current source 213 is active during the scan is above the threshold, then the output may be a binary 1, otherwise the output may be a binary 0. The sensor device 115 may utilize the binary encoding of the output of the Rx sensors 206 from each Rx column 205 to calculate and/or lookup the absolute position of the target 110A, as discussed in further detail herein. More specifically, each of the plurality of Rx columns 205 covers a distance (e.g., 2 mm) such that each successive Rx column 205 indicates a position. The sensor device 115 may determine an Rx column 205 whose Rx sensors 206 all have outputs of binary 1, and determine the position of the target 110A as the position indicated by that Rx column 205. Modified threshold levels and additional thresholds may be used for improved algorithms and increased accuracy.

It should be noted that in practical operation, there is always e.g., interference present so the current source 213 may be active for a minimum amount of time during each scan to account for such interference. As a result, the threshold may correspond to a delta in the total time the current source 213 is active that is large enough to account for such interference. For example, if Rx sensor 206A is not covered by the target 110A, it is not currently capacitively coupled to the Tx sensor 210A. However, the current source 213 would still be active for relatively small amounts of time to account for the effects of interference. Once Rx sensor 206A is covered by the target 110A and it is capacitively coupled to the Tx sensor 210A, then the amount of time the current source 213 must be active may increase by orders of magnitude.

As shown in FIG. 2A, between consecutive Rx columns 205, only 1 out of the 4 Rx sensors 206 may be driven by a different Rx signal. For example, the 1st, 2nd, and 4th Rx sensors in Rx columns 205G and 205H are all driven by signals 0, 1, and 7. However, the 3rd Rx sensor 206 in column 205G is driven by Rx signal 5 while the 3rd sensor 206 in Rx column 205H is driven by Rx signal 6. This change from Rx column to Rx column may be due to the use of gray code to ensure that there are always 4 sensors active at a minimum when the target 110A is directly over an Rx column 205.

To determine the position of the target 110A, the sensor device 115 may initially search for Rx columns 205 where the output of all 4 Rx sensors 206 is a binary 1. However, the sensor device 115 may often times determine that no Rx columns 205 meet this criteria, and in such scenarios, it may proceed to search for Rx columns 205 where the output of three of the Rx sensors 206 is a binary 1. Upon determining two consecutive Rx columns where the output of three of the Rx sensors 206 is a binary 1, the sensor device 115 may determine that the target 110A is between these two Rx columns and may perform additional post processing to look at the relative signal strength between the Rx sensor having the weakest output of each the two Rx columns to increase the resolution of the detected location of the target 110A through interpolation as discussed further with respect to FIG. 2B.

Figure 2B:
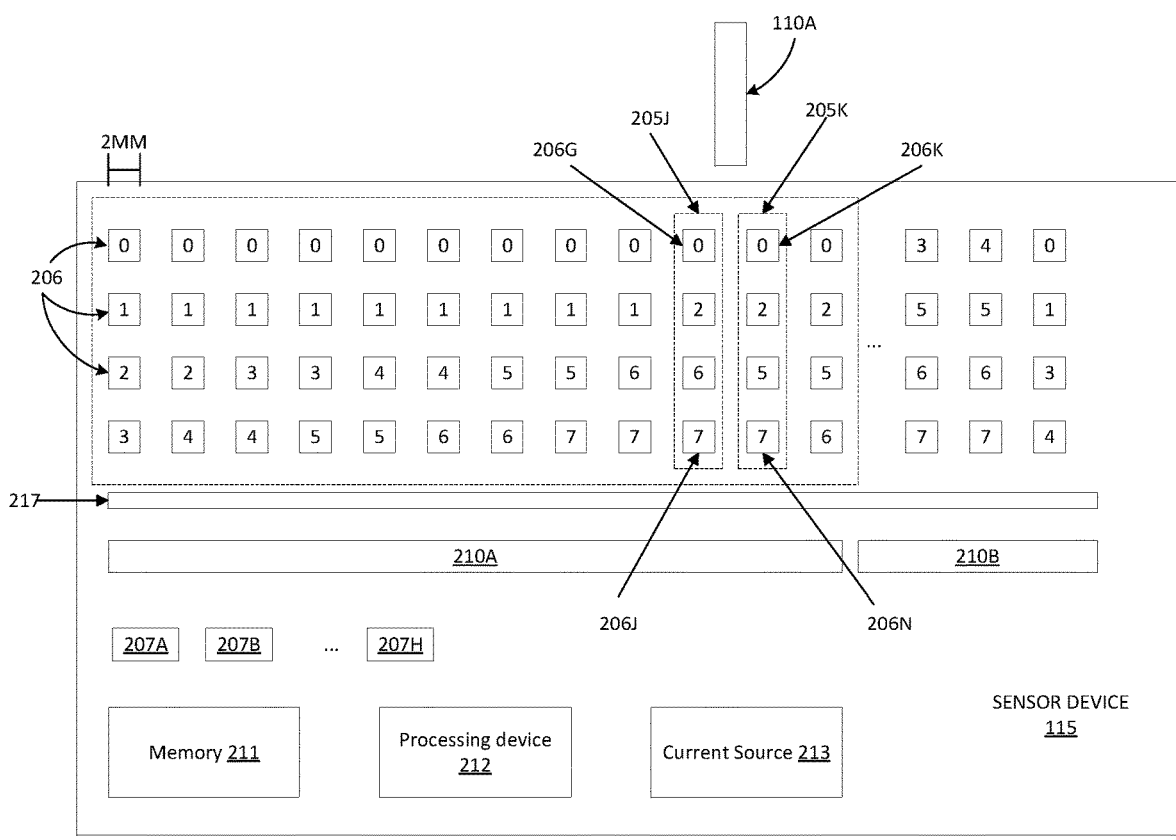

FIG. 2B illustrates a scenario when the target 110A is located between two Rx columns 205J (including Rx sensors 206G-206J in rows 1-4 respectively) and 205K (including Rx sensors 206K-206N in rows 1-4 respectively). As shown in FIG. 2B, the target 110A is half way between the Rx sensors 206 in rows 1, 2, 3, and 4 of Rx columns 205J and 205K. The Rx sensors 206 in rows 1, 2, and 4 of Rx columns 205J and 205K are driven by the same Rx signal (0, 2, and 7 respectively). As a result, although the target 110A is split physically between Rx columns 205J and 205K, because the Rx sensors 206 in rows 1, 2, and 4 of neighboring Rx columns 205J and 205K are driven by the same Rx signal (0, 2, and 7 respectively), these Rx sensors 206 may be electrically shorted (i.e. they may appear electrically as if they were part of a single Rx column and so the measured signal at these Rx sensors may be higher than the threshold) and so a binary output of 1 will be read for Rx signals 0, 2, and 7 respectively (i.e., read at each of the Rx sensors 206 in rows 1, 2, and 4 of Rx columns 205J and 205K). In row 3, where the target 110A is split between Rx sensors 206I and 206M, the measured signal from those Rx sensors may be approximately half the measured signal from the other Rx sensors. This is because the Rx sensors 206 in row 3 of Rx columns 205J and 205K are driven by different Rx signals (5 and 6 respectively) and so they are not electrically shorted (resulting in a binary output of 0 being read for Rx signals 5 and 6 respectively). As a result, the sensor device 115 determines that the amount of time the current source 213 must be active to keep Rx sensors 206I and 206M balanced is half the time required to keep the other Rx sensors 206 in Rx columns 205J and 205K balanced.

Figure 2C:
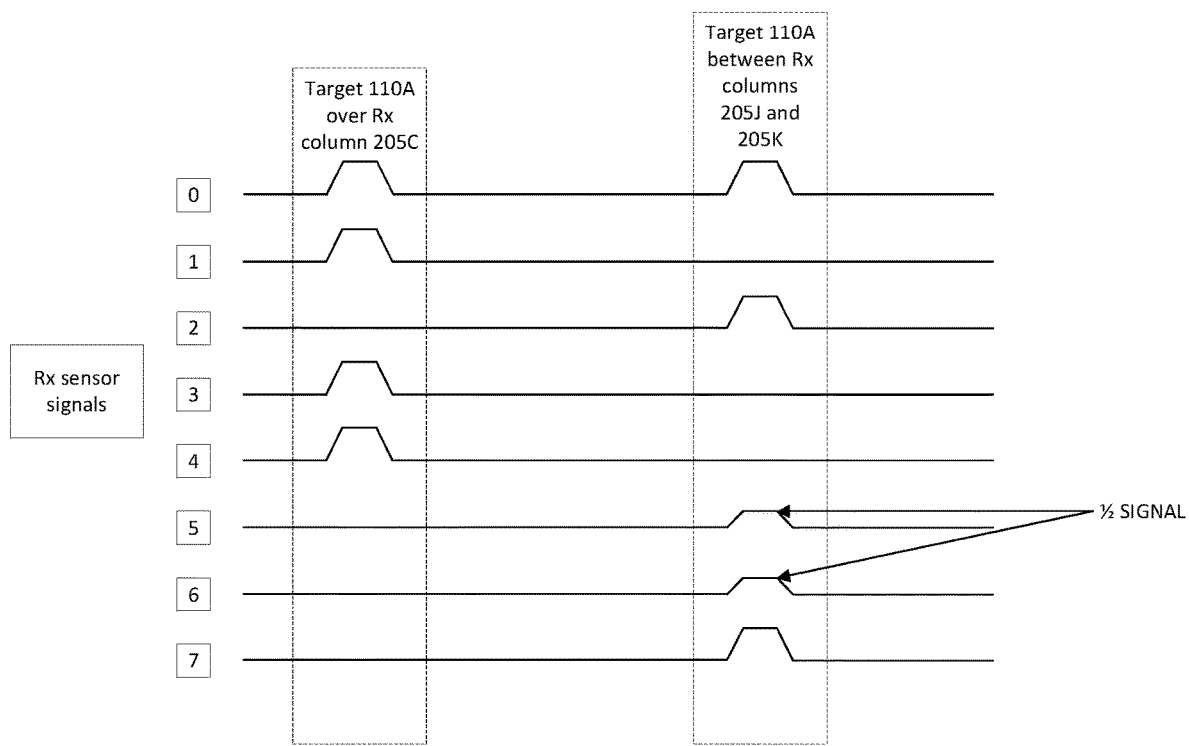
FIG. 2C illustrates a diagram of Rx signals as a target of the position sensing system of FIG. 1 moves, according to some embodiments of the present disclosure.

FIG. 2C illustrates a diagram of the Rx signals 0-7 as the target 110A moves, including the Rx signals read from the Rx sensors 206 when target 110A is over Rx column 205C (i.e., Rx signals 0, 1, 3, and 4) as well as the Rx signals read from each of the sensors 206G-206N when the target 110A is located between Rx columns 205J and 205K (i.e., Rx signals 0, 2, 5, 6, and 7). As can be seen, the Rx signals 5 and 6 have approximately half the peak as the Rx signals 0, 2, and 7 (read from electrically connected Rx sensors 206 in rows 1, 2, and 4 of Rx columns 205J and 205K). Based on this, the sensor device 115 may determine that the target 110A is half way between Rx columns 205J and 205K (with a resolution of 1 mm on each Rx column 205J and 205K). Although illustrated with the target 110A half way between Rx columns 205J and 205K, the sensor device 115 can interpolate to account for scenarios where the target 110A is closer to (covering more of) Rx column 205J than Rx column 205K and vice versa. In the above example, assuming that the measured signal of Rx sensor 206I was measured at 75% of the measured signal from the other Rx sensors in Rx column 205J, and the measured signal of Rx sensor 206M was measured at 25% of the measured signal from the other Rx sensors in Rx column 205K, the sensor device 115 may determine that the target 110A is closer to Rx column 205J than Rx column 205K.

There may be scenarios where the target 110A is located 95% over column 205J and 5% over column 205K. In these (and potentially other) scenarios, the sensor device 115 may still interpolate to give the position based on the required accuracy. For example, if the desired resolution is 2 mm accuracy, then the sensor device 115 may determine that 95% is enough to generate the "1" value. However, if higher resolution is required, then the algorithm may be tuned to require interpolation based on the desired resolution.

Although illustrated with Rx sensor spacing of 2 mm over a 140 mm range, these measurements are for example purposes only, and the Rx sensor spacing can be any appropriate distance based on the desired resolution. The sensor device 115 may comprise the sensor pattern 202 of FIGS. 2A and 2B repeated over any required intervals to cover the required e.g., 750 mm distance. To extend the 140 mm range in this example, the sensor pattern 202 may be duplicated with each duplicate coupled to a separate Tx sensor 210. It should be noted that a new Tx sensor 210 may be required for each duplicate of the Rx sensor pattern 202. This is because a 4-bit sensor pattern using 8 Rx signals (as illustrated in FIGS. 2A and 2B) results in 70 columns, as discussed above. Thus, a new Tx sensor 210 is required every 70 columns otherwise the sensor device 115 may be unable to distinguish which iteration of the sensor pattern 202 the target is proximate to.

In this example, a total of 6 Tx sensors 210 would cover the full 750 mm range. FIG. 2A illustrates a portion of a first duplicate sensor pattern 202A (with 3 Rx columns of pattern 202A shown) which is coupled to a Tx sensor 210B. In this scenario, 14 pins (8 Rx signals and 6 Tx signals) may be required to implement the sensor device 115. However, the number of Rx and Tx signals may be optimized to ensure position detection accuracy. For example, 11 total Rx signals (n) spread over 5 Rx sensors (r) in each Rx column, and 1 Tx sensor, would also cover the full 750 mm length with 2 mm accuracy using a total of 12 pins. FIG. 2D illustrates a table 250 that lists the maximum number of unique codes (Rx signal combinations) using the combinatorial equation given above (total combinations=n!/(r!(n−r)!).

A PCB layout involving eight interweaved Rx signals that require low parasitic and shielding from the six Tx signals as discussed in the above embodiments may be complex to manufacture. An additional benefit of the above embodiments includes a simplified layout of a printed circuit board (PCB) for the sensor device 115. As shown in FIGS. 2A and 2B, all Rx signals run perpendicular to the Rx sensor columns 205 and are present on the surface of the sensor device 115 in an organized way, thus simplifying the layout. In addition, Tx signals can be separated from the Rx signals and shielded under the currently active Tx sensor in that region/pattern iteration.

In some embodiments, an Rx sensor pattern 202 may be coupled to multiple Tx sensors 210. This may be useful in situations where e.g., a single Tx sensor may become too large, resulting in a capacitive load that is too high for the I/O pin to drive efficiently (as the length of a Tx sensor increases so does its area, which is directly proportional to its capacitance). By utilizing multiple Tx sensors the sensor device 115 may drive multiple Tx signals using individual pins for each.

The signal itself (time that current source 213 is on) is a highly sensitive analog signal that is based on balancing current sources, and can change dramatically as a result. This varying capacitive baseline can be tracked over time using the Rx sensors 206 that are not currently coupled to the target 110A. Because there is always at least one Rx column 205 column covered by the target 110A, four of the eight Rx signals always have a baseline value while the other four Rx signals always have an active value. The simplest baseline method is to average all eight Rx signals and offset each Rx signal from this average. These offsets are determined at manufacture and stored in the device. Further testing and refinement may allow elimination of this calibration step if the manufacturing variation is low. In an example where the target 110A is between Rx columns and five Rx signals are active, the two Rx signals corresponding to the ½ covered Rx sensors average out to the nominal case of four Rx signals. The lack of a target can also be determined by comparing Rx signal measurement with and without the Tx signal present. If no Rx signals are over the threshold and they are all close in calibrated value, then no target is present.

By ensuring that approximately half of the Rx sensors 206 are covered, while the other half are not, the baseline may be continuously updated and changes in the average signal between them may be tracked. With standard capacitive sensing techniques this is not possible because Rx signal increases can only be detected on the Rx sensor currently being scanned. Stated differently, while an Rx sensor is being scanned, its baseline/threshold R signal value cannot be updated because there is nothing to compare it against i.e., there is no reference with which a delta change over time can be observed.

One concern with long distances and a metal framework (e.g., of the measurement beam 105) is the signal to noise ratio. The sensor device 115 may utilize a known metal target creating a uniform signal and the assumed ability to have a long scan period to filter out noise. Sufficient signal levels determine the maximum number of targets, and RX sensors, and sensor dimensions that can be accommodated with a single sensor PCB. More specifically, as the sensor device 115 increases in area the parasitic capacitance of the Rx and Tx sensors may increase, reducing the capacitive change when the target 110 is present over an Rx sensor 206.

As the decrease in capacitive change signal approaches the system natural noise level, it becomes more difficult to determine if the signal at the Rx sensor 206 is above the threshold due to the target 110A or due to noise. By averaging the signal over time it is possible to differentiate the (generally) above threshold signal values caused by the target 110A from the (generally) below threshold levels of random noise. Increasing the area of the Tx and Rx sensors increases the mutual capacitance coupled between them. Increased capacitance results in a higher signal when the target 110A is present assisting in avoiding false sensor threshold detections due to noise. The mechanical constraints of the system 100 may determine the area available for Rx sensors 206.

Figure 3A:
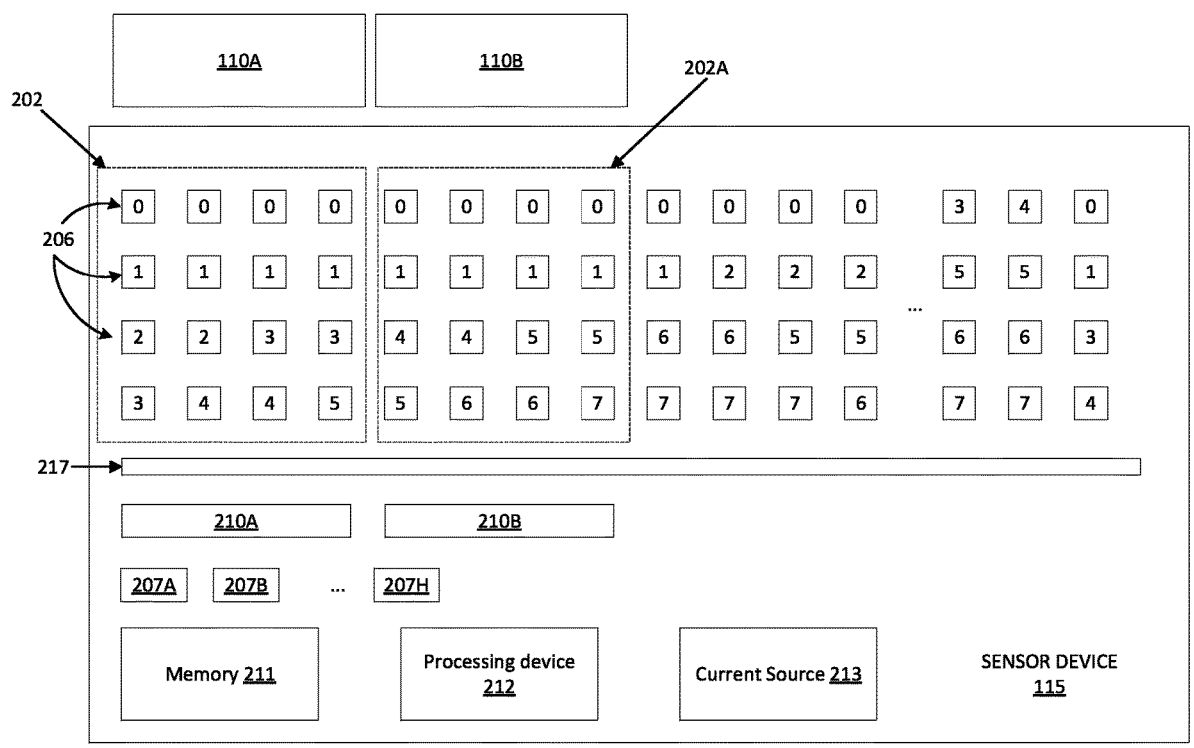
FIGS. 3A-3B illustrate a sensor device of the position sensing system of FIG. 1, according to some embodiments of the present disclosure.

The embodiments described up to this point support a single target 110A because if two targets 110 are capacitively coupled to the same Tx and Rx sensors, sensor device 115 cannot determine the position of either target 110. FIG. 3A illustrates the sensor device 115 according to some embodiments of the present disclosure for detecting the position of multiple targets 110 along the measurement beam 105.

As can be seen, the Rx sensor patterns 202 and matching Tx sensors 210 may be of short enough length that mechanically, two or more targets 110 cannot occupy the same region/sensor pattern 202 of the sensor device 115. Stated differently, the mechanical limits of the sensor device 115 ensure that two targets 110 will never be coupled to the same TX sensor 210. The sensor device 115 may use the Tx signals for each Tx sensor 210 to differentiate the different targets 110. More specifically, each target 110 may couple to a unique Tx sensor 210 out of the shared array of Tx sensors 210 and the sensor device 115 may enable each Tx sensor 210 in sequence and determine the corresponding target 110's unique Rx sensor pattern. It should be noted that any target 110 may couple to any Tx sensor 210 because the passive metal coupling between the targets 110 and the measurement beam 105 has the same orientation regardless. In the example of FIG. 3A, each Rx sensor pattern 202 is five inches long, while each target 110 is ten inches.

Figure 3B:
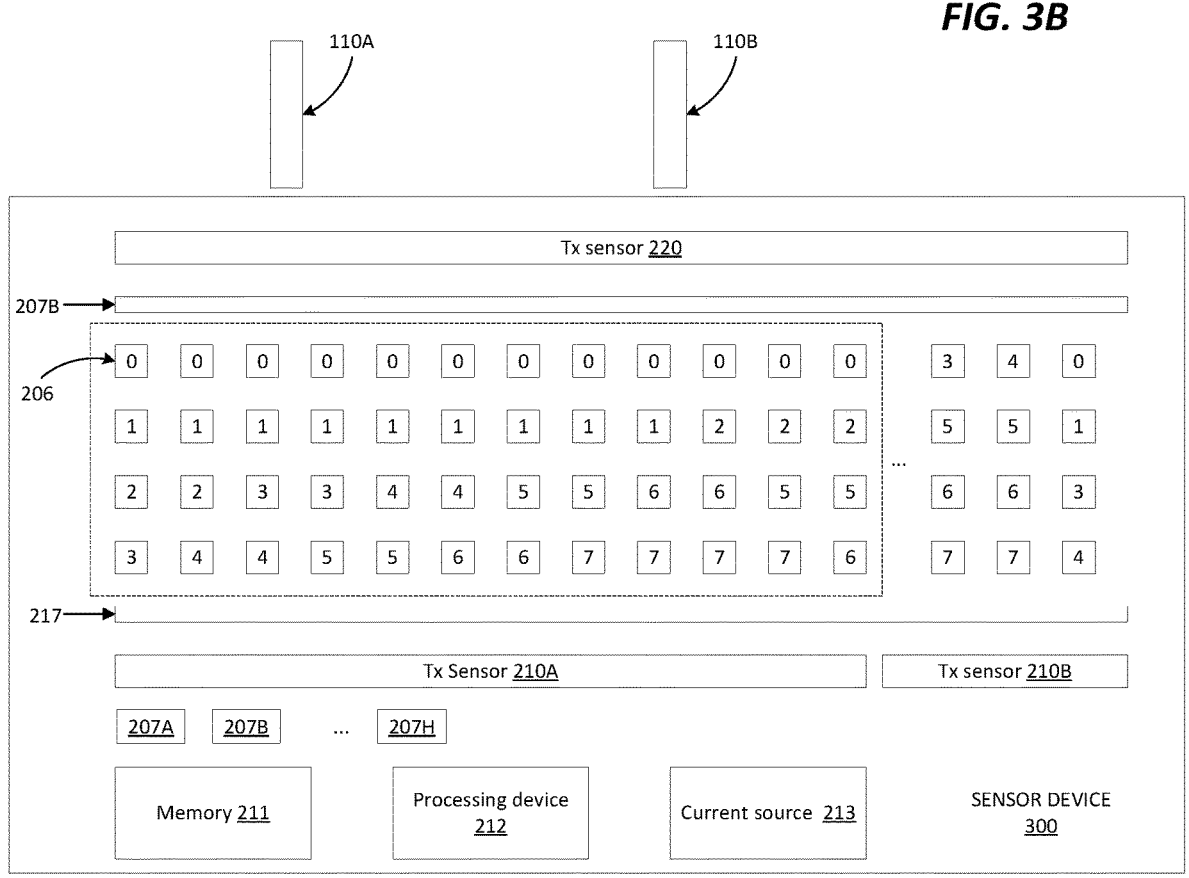

FIG. 3B illustrates a sensor device 300 according to some embodiments of the present disclosure for detecting the position of multiple targets 110 along the measurement beam 105. The sensor device 300 may comprise the components of sensor device 115 and may further comprise a Tx sensor 220 located on top of the Rx sensor pattern 202A. The Tx sensor 220 may be coupled exclusively to a second target 110B while Tx sensor 210A may be coupled exclusively to target 110A. Stated differently, each target 110 must have a different/unique passive metal coupling orientation to allow coupling with only that target 110's corresponding Tx sensor. In this way, regardless of whether the targets 110A and 110B are located right next to each other (as shown in FIG. 3B) or far apart from each other with respect to the Rx sensor pattern 202, the sensor device 300 may still differentiate between them. The sensor device 300 may further comprise a second guard channel 217 that is coupled between the Rx sensor columns 205 and the Tx sensor 220 to collapse the electric field between the Rx sensor columns 205 and the Tx sensor 220 in order to minimize direct capacitive coupling that may result when the target 110B is not present.

Figure 3C:
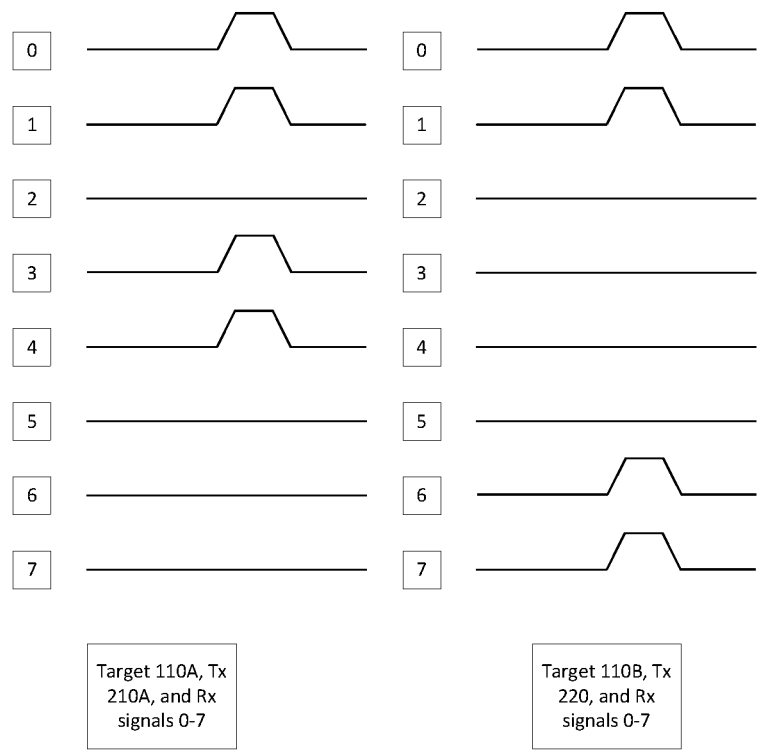
FIG. 3C illustrates a diagram of Rx signals as a target of the position sensing system of FIG. 1 moves, according to some embodiments of the present disclosure.

In operation, when the sensor device 115 is scanning Tx sensor 210A, it may turn off Tx sensor 220, and when scanning Tx sensor 220, it may turn off Tx sensor 210A. By enabling each target 110's dedicated TX sensor(s), the sensor device 300 can determine each target 110's position. Method 2 requires additional area to place the second Tx sensor 220. This method can be extended similarly for more targets by adding unique Tx sensors and target orientations. FIG. 3C illustrates a diagram of the Rx signals 0-7 as the target 110A moves, including the Rx signals read from each of the sensors 206G-206N (i.e., Rx signals 0, 2, 5, 6, and 7) when the target 110A is located between Rx columns 205J and 205K.

Figure 4:
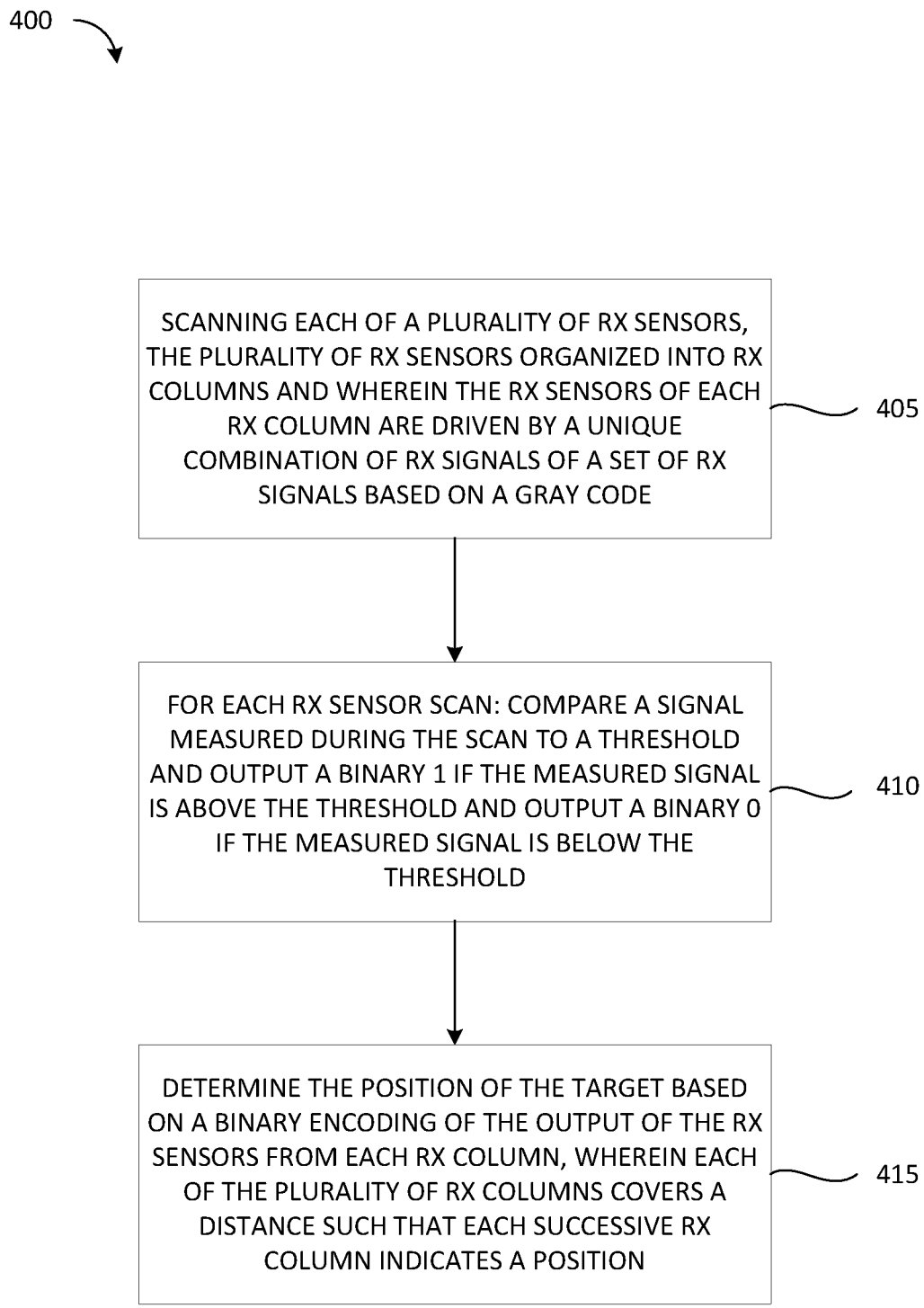
FIG. 4 illustrates a flow diagram of a method for detecting the position of a target along a beam using capacitive sensing, in accordance with some embodiments of the present disclosure.

FIG. 4 is a flow diagram of a method 400 for detecting the position of a target along a beam using capacitive sensing, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 400 may be performed by the sensor device 115 of FIGS. 2A, 2B, and 3A (as well as the sensor device 300 of FIG. 3B) executing position detection firmware.

At block 405, the sensor device 115 may scan each of a plurality of Rx sensors 206, the plurality of Rx sensors organized into Rx columns 205 and wherein the Rx sensors 206 of each Rx column 205 are driven by a unique combination of Rx signals from a set of Rx signals based on a gray code.

At block 410, for each Rx sensor scan, the sensor device 115 may: compare a signal measured during the scan to a threshold and output a binary 1 if the measured signal is above the threshold and output a binary 0 if the measured signal is below the threshold.

At block 415, the sensor device 115 may determine the position of the target based on a binary encoding of the output of the Rx sensors 206 from each Rx column 205, wherein each of the plurality of Rx columns covers a distance such that each successive Rx column indicates a position of the target 110A.

Figure 5:
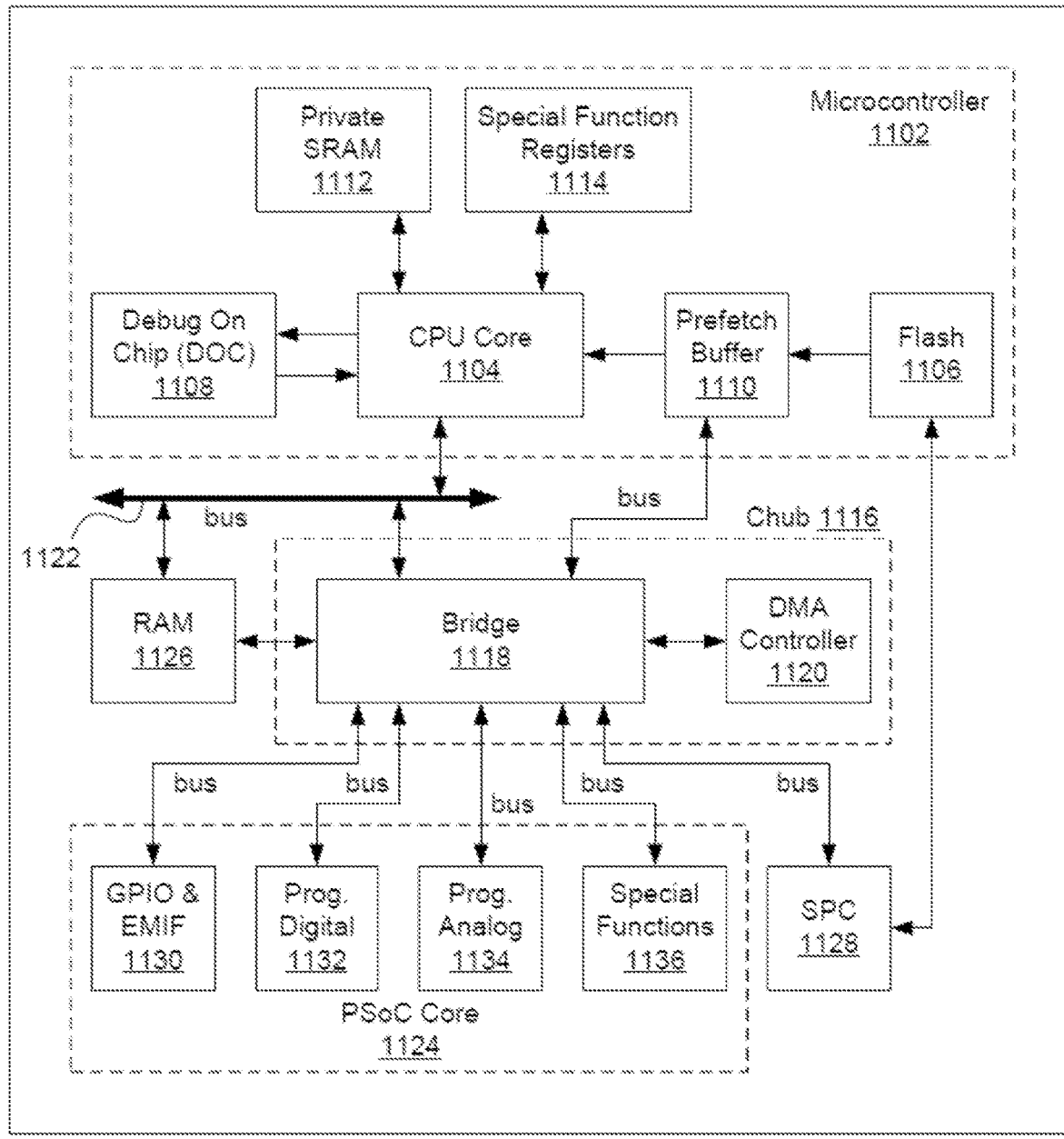
FIG. 5 illustrates an embodiment of a core architecture of the Programmable System-on-Chip (PSoC®) processing device.

FIG. 5 illustrates an embodiment of a core architecture 500 of the PSoC® processing device, such as that used in the PSoC3® family of products offered by Cypress Semiconductor Corporation (San Jose, Calif.) within which embodiments of the present disclosure may be implemented. In one embodiment, the core architecture 500 includes a microcontroller 1102. The microcontroller 1102 includes a CPU (central processing unit) core 1104 (which may correspond to processing device 130 of FIG. 1), flash program storage 1106, DOC (debug on chip) 1108, a prefetch buffer 1110, a private SRAM (static random access memory) 1112, and special functions registers 1114. In an embodiment, the DOC 1108, prefetch buffer 1110, private SRAM 1112, and special function registers 1114 are coupled to the CPU core 1104 (e.g., CPU core 1006), while the flash program storage 1106 is coupled to the prefetch buffer 1110.

The core architecture 500 may also include a CHub (core hub) 1116, including a bridge 1118 and a DMA controller 1120 that is coupled to the microcontroller 1102 via bus 1122. The CHub 1116 may provide the primary data and control interface between the microcontroller 1102 and its peripherals (e.g., peripherals) and memory, and a programmable core 1124. The DMA controller 1120 may be programmed to transfer data between system elements without burdening the CPU core 1104. In various embodiments, each of these subcomponents of the microcontroller 1102 and CHub 1116 may be different with each choice or type of CPU core 1104. The CHub 1116 may also be coupled to shared SRAM 1126 and an SPC (system performance controller) 1128. The private SRAM 1112 is independent of the shared SRAM 1126 that is accessed by the microcontroller 1102 through the bridge 1118. The CPU core 1104 accesses the private SRAM 1112 without going through the bridge 1118, thus allowing local register and RAM accesses to occur simultaneously with DMA access to shared SRAM 1126. Although labeled here as SRAM, these memory modules may be any suitable type of a wide variety of (volatile or non-volatile) memory or data storage modules in various other embodiments.

In various embodiments, the programmable core 1124 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 1124 includes a GPIO (general purpose IO) and EMIF (extended memory interface) block 1130 to provide a mechanism to extend the external off-chip access of the microcontroller 1102, a programmable digital block 1132, a programmable analog block 1134, and a special functions block 1136, each configured to implement one or more of the subcomponent functions. In various embodiments, the special functions block 1136 may include dedicated (non-programmable) functional blocks and/or include one or more interfaces to dedicated functional blocks, such as USB, a crystal oscillator drive, JTAG, and the like.

The programmable digital block 1132 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 1132 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 1104) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like);

an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 1134 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 1134 may support various analog functions including, but not limited to, analog routing, LCD drive IO support, capacitance-sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

The embodiments described herein may be used in various designs of mutual-capacitance sensing systems, in self-capacitance sensing systems, or combinations of both. In one embodiment, the capacitance sensing system detects multiple sense elements that are activated in the array and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "detecting," "comparing," "resetting," "adding," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:

1. An apparatus comprising:
   a plurality of receive (Rx) sensors organized into a plurality of Rx columns, each Rx sensor of the plurality of Rx sensors driven by an Rx signal of a set of Rx signals;
   a transmit (Tx) sensor, the Tx sensor configured to couple to Rx sensors of one or more Rx columns in response to a target moving into proximity of the one or more Rx columns;
   a processing device operatively coupled to the memory, the processing device configured to:
      scan each of the plurality of Rx sensors; and
      determine a position of the target based on the scan of each of the plurality of Rx sensors using mutual capacitive sensing; and
   a guard channel coupled between the plurality of Rx columns and the Tx sensor to collapse electric field lines generated by the Tx sensor when the target is not present.

2. The apparatus of claim 1, wherein the Rx sensors of each Rx column are driven by a unique combination of Rx signals of the set of Rx signals based on a gray code.

3. The apparatus of claim 1, wherein to determine the position of the target, the processing device is configured to:
   for each Rx sensor scan:
      compare a signal measured during the scan to a threshold; and
      output a binary 1 if the measured signal is above the threshold and output a binary 0 if the measured signal is below the threshold; and
   determine the position of the target based on a binary encoding of the output of the Rx sensors from each Rx column, wherein each of the plurality of Rx columns covers a distance such that each successive Rx column indicates a position.

4. The apparatus of claim 3, wherein to determine the position of the target based on the binary encoding of the output of the Rx sensors from each Rx column, the processing device is further configured to:
   determine an Rx column of the plurality of Rx columns whose corresponding Rx sensors each have an output of binary 1; and
   determine as the position of the target, a position indicated by the Rx column whose corresponding Rx sensors each have an output of binary 1.

5. The apparatus of claim 3, further comprising:
   a current source configured to maintain a current balance of each of the plurality of RX sensors, and wherein the measured signal of an RX sensor scan corresponds to an amount of time the current source is active to maintain a current balance of the Rx sensor being scanned.

6. The apparatus of claim 1, further comprising:
   a second plurality of Rx sensors organized into a second plurality of Rx columns;
   a Tx sensor configured to couple to Rx sensors of one or more of the second plurality of Rx columns in response to a second target moving into proximity of the one or more second Rx columns.

7. The apparatus of claim 6, wherein the processing device is further configured to:
   scan each of the second plurality of Rx sensors; and
   determine a position of the second target based on the scan of each of the second plurality of Rx sensors using mutual capacitive sensing.

8. The apparatus of claim 1, wherein the Tx sensor is turned off when being scanned.

9. The apparatus of claim 1, wherein the plurality of Rx columns comprises an Rx sensor pattern.

10. The apparatus of claim 9, further comprising:
    one or more additional Rx sensor patterns and one or more additional Tx sensors.

11. A system comprising:
    a measurement beam;
    one or more targets configured to move along the measurement beam; and
    a sensor device located within the measurement beam, the sensor device comprising:
       a plurality of receive (Rx) sensors organized into a plurality of Rx columns, each Rx sensor of the plurality of Rx sensors driven by an Rx signal of a set of Rx signals;
       a transmit (Tx) sensor, the Tx sensor configured to couple to Rx sensors of one or more Rx columns in response to a target of the one or more targets moving into proximity of the one or more Rx columns;
       a processing device configured to:
          scan each of the plurality of Rx sensors; and
          determine a position of the target based on the scan of each of the plurality of Rx sensors using mutual capacitive sensing; and
       a guard channel coupled between the plurality of Rx columns and the Tx sensor to collapse electric field lines generated by the Tx sensor when the target is not present.

12. The system of claim 11, wherein the Rx sensors of each Rx column are driven by a unique combination of Rx signals of the set of Rx signals based on a gray code.

13. The system of claim 11, wherein to determine the position of the target, the processing device is configured to:
    for each Rx sensor scan:
       compare a signal measured during the scan to a threshold; and
       output a binary 1 if the measured signal is above the threshold and output a binary 0 if the measured signal is below the threshold; and
    determine the position of the target based on a binary encoding of the output of the Rx sensors from each Rx column, wherein each of the plurality of Rx columns covers a distance such that each successive Rx column indicates a position.

14. The system of claim 13, wherein to determine the position of the target based on the binary encoding of the output of the Rx sensors from each Rx column, the processing device is further configured to:
   determine an Rx column of the plurality of Rx columns whose corresponding Rx sensors each have an output of binary 1; and
   determine as the position of the target, a position indicated by the Rx column whose corresponding Rx sensors each have an output of binary 1.

15. The system of claim 13, wherein the sensor device further comprises:
   a current source configured to maintain a current balance of each of the plurality of RX sensors, and wherein the measured signal of an RX sensor scan corresponds to an amount of time the current source is active to maintain a current balance of the Rx sensor being scanned.

16. The system of claim 11, wherein the sensor device further comprises:
   a second plurality of Rx sensors organized into a second plurality of Rx columns;
   a Tx sensor configured to couple to Rx sensors of one or more of the second plurality of Rx columns in response to a second target of the one or more targets moving into proximity of the one or more second Rx columns.

17. The system of claim 16, wherein the processing device is further configured to:
   scan each of the second plurality of Rx sensors; and
   determine a position of the second target based on the scan of each of the second plurality of Rx sensors using mutual capacitive sensing.

18. The system of claim 11, wherein the Tx sensor is turned off when being scanned.

19. The system of claim 11, wherein the plurality of Rx columns comprises an Rx sensor pattern.

20. The system of claim 19, wherein the sensor device further comprises:
   one or more additional Rx sensor patterns and one or more additional Tx sensors.

* * * * *